US005850684A

United States Patent [19]

Ichitou et al.

[11] Patent Number: 5,850,684

[45] Date of Patent: Dec. 22, 1998

[54] CABLE-END-PORTION BEND FORMING DEVICE FOR AUTOMATIC CONNECTING APPARATUS

[75] Inventors: Toshikatsu Ichitou; Hideyuki Ishioka, both of Tokyo; Takahiro Okamura; Atsuro Nakamura, both of Mie; Shinichi Takehana, Nagano; Hirokazu Yokozawa, Nagano; Toshiharu Hizawa, Nagano, all of Japan

[73] Assignees: Hirose Electric Co., Ltd., Tokyo; Sumitomo Wiring System, Ltd., Yokkaichi, both of Japan

[21] Appl. No.: 385,814

[22] Filed: Feb. 8, 1995

[30] Foreign Application Priority Data

Mar. 29, 1994 [JP] Japan .................................... 6-081157

[51] Int. Cl.[6] ...................................................... B23P 19/02

[52] U.S. Cl. ............................................................... 29/748

[58] Field of Search ............................ 29/748, 749, 755; 140/92.1, 93 R, 102

[56] References Cited

U.S. PATENT DOCUMENTS

| | | | |
|---|---|---|---|
| 4,534,098 | 8/1985 | Bron et al. ................................ | 29/749 |
| 4,551,893 | 11/1985 | Ikeda et al. . | |
| 4,616,396 | 10/1986 | Matsui . | |
| 5,031,847 | 7/1991 | Tanaka . | |
| 5,052,449 | 10/1991 | Fukud et al. .......................... | 140/93 R |

OTHER PUBLICATIONS

Corresponding to Japanese Patent Publication 4–35849 (1992/Discl. 60–30009 (1985), as a prior art mentioned in the specification).

Corresponding to Japanese Patent Disclosure 60–117583 (1985), for the background of the application.

Corresponding to Japanese UM Disclosure 2–133818, for the background of the application.

*Primary Examiner*—Lowell A. Larson

*Attorney, Agent, or Firm*—Rosen, Dainow & Jacobs, L.L.P

[57] ABSTRACT

A cable-end-portion bend forming device for an automatic connecting apparatus includes: a front guide roller and a rear guide roller for guiding a cable being fed out at two positions on front and rear sides of the device; and a front forming roller and a rear forming roller disposed between the two positions and supported rotatably by two supporting members, respectively, the front forming roller and the rear forming roller being adapted to approach positions of abutment, or substantial abutment, against the front guide roller and the rear guide roller, respectively, wherein at least the supporting member for supporting the rear forming roller is capable of moving the rear forming roller between a position in close proximity to the rear guide roller and a position spaced apart therefrom.

5 Claims, 4 Drawing Sheets

CABLE-END-PORTION BEND FORMING DEVICE FOR AUTOMATIC CONNECTING APPARATUS

BACKGROUND OF THE INVENTION

1. Field of the Invention

The present invention relates to a device for forming bends at both end portions of a cable before connectors are respectively connected automatically to both ends of cables.

2. Description of the Related Art

When two connectors are automatically connected to both ends of a plurality of cables, the two connectors are held at a relatively shorter interval than the length of the cables to which the connectors are connected, so as to make a connecting apparatus compact. Accordingly, in a state in which the cables are held by the connecting apparatus, the cables are slackened in a U-shape during and after connection.

For example, in an apparatus disclosed in Japanese Patent Examined Publication No. 35849/1992, guide rollers are respectively provided between the two connectors in close proximity thereto. Even after the distal ends of the cables have reached the position of a forwardly located connector, the cables are fed out a predetermined length to allow the cables to be suspended between the two guide rollers in a slackened state by their own weight, and after the cables are cut on the side of a rearwardly located connector, the cables are connected to the two connectors.

In the above-described publicly known apparatus, in a case where the plurality of cables are connected to the same connectors, since the respective cables are slightly curled permanently from the outset, each cable is curved toward adjacent cables in the state in which the cables are slack. Hence, if the cables are stretched tautly after releasing the two connectors subsequent to connection, the cables can be entangled with each other or so-called kinks can occur due to the twisting of the cables, which is undesirable.

SUMMARY OF THE INVENTION

Accordingly, it is an object of the present invention to provide a cable-end-portion bend forming device for an automatic connecting apparatus which makes it possible to prevent each cable from becoming curved toward adjacent cables in a suspended state in which both end portions of cables are formed by being bent downward before connection, thereby overcoming the above-described drawback of the conventional art.

In accordance with the present invention, the above object is attained by providing a cable-end-portion bend forming device for an automatic connecting apparatus, comprising: a front guide roller and a rear guide roller for guiding a cable being fed out at two positions on front and rear sides of the device; and a front forming roller and a rear forming roller disposed between the two positions and supported rotatably by two supporting members, respectively, the front forming roller and the rear forming roller being adapted to approach positions of abutment, or substantial abutment, against the front guide roller and the rear guide roller, respectively, wherein at least the supporting member for supporting the rear forming roller is capable of moving the rear forming roller between a position in close proximity to the rear guide roller and a position spaced apart therefrom.

In the device of the present invention having the above-described arrangement, when a cable which is guided by the two guide rollers, i.e., the front guide roller and the rear guide roller, is fed out a predetermined length, the cable is slackened and suspended downward between the two guide rollers.

Since a leading end of the cable does not advance any further after reaching the position of the front guide roller, the front forming roller approaches the front guide roller up to the position where the front forming roller substantially abuts against the front guide roller, thereby forming a bend in the front-end portion of the cable along part of the peripheral surface of the front guide roller.

Meanwhile, when the cable is fed out the predetermined length for the rear guide roller, the rear forming roller is at the position spaced apart from the rear guide roller. Accordingly, the cable, when fed out, is not restricted by the rear forming roller. At that time, if the spaced-apart position of the rear forming roller is located slightly lower than the heightwise level of the rear guide roller, the cable being guided by the rear guide roller is inclined slightly downward by its own weight, and is guided diagonally downward by the rear forming roller. Consequently, a phenomenon in which the cable jumps upward, i.e., the situation of a so-called springing-up cable, does not occur. After the predetermined length of the cable is fed out, the supporting member for supporting the rear forming roller moves, and the rear forming roller approaches the rear guide roller up to the position where the rear forming roller substantially abuts against the rear guide roller. As a result, a bend is formed in the rear-end portion of the cable in the same way as the front-end portion thereof, and the cable is cut at a portion located rearwardly of the bent portion.

Thus, the cable in which bends are formed in the front- and rear-end portions by the front forming roller and the rear forming roller is not curved toward adjacent cables, and is suspended downward in a U-shape. Such cables are connected to connectors at both ends of the cables in a process that follows.

In accordance with the present invention, as described above, the arrangement provided is such that since bends are respectively formed in both end portions of the cable having a predetermined length in preparation for connection, a plurality of cables which are consecutively connected to connectors are prevented from becoming curved toward adjacent cables, and even if the cables are pulled straightly after connection, the cables do not become entangled with each other or so-called kinks do not occur. Thus, the handling of cables after connection is facilitated substantially.

The above and other objects, features and advantages of the present invention will become more apparent from the following detailed description of the invention when read in conjunction with the accompanying drawings.

DESCRIPTION OF THE PREFERRED EMBODIMENT

Referring now to the accompanying drawings, a description will be given of an embodiment of the present invention.

Figure 1:
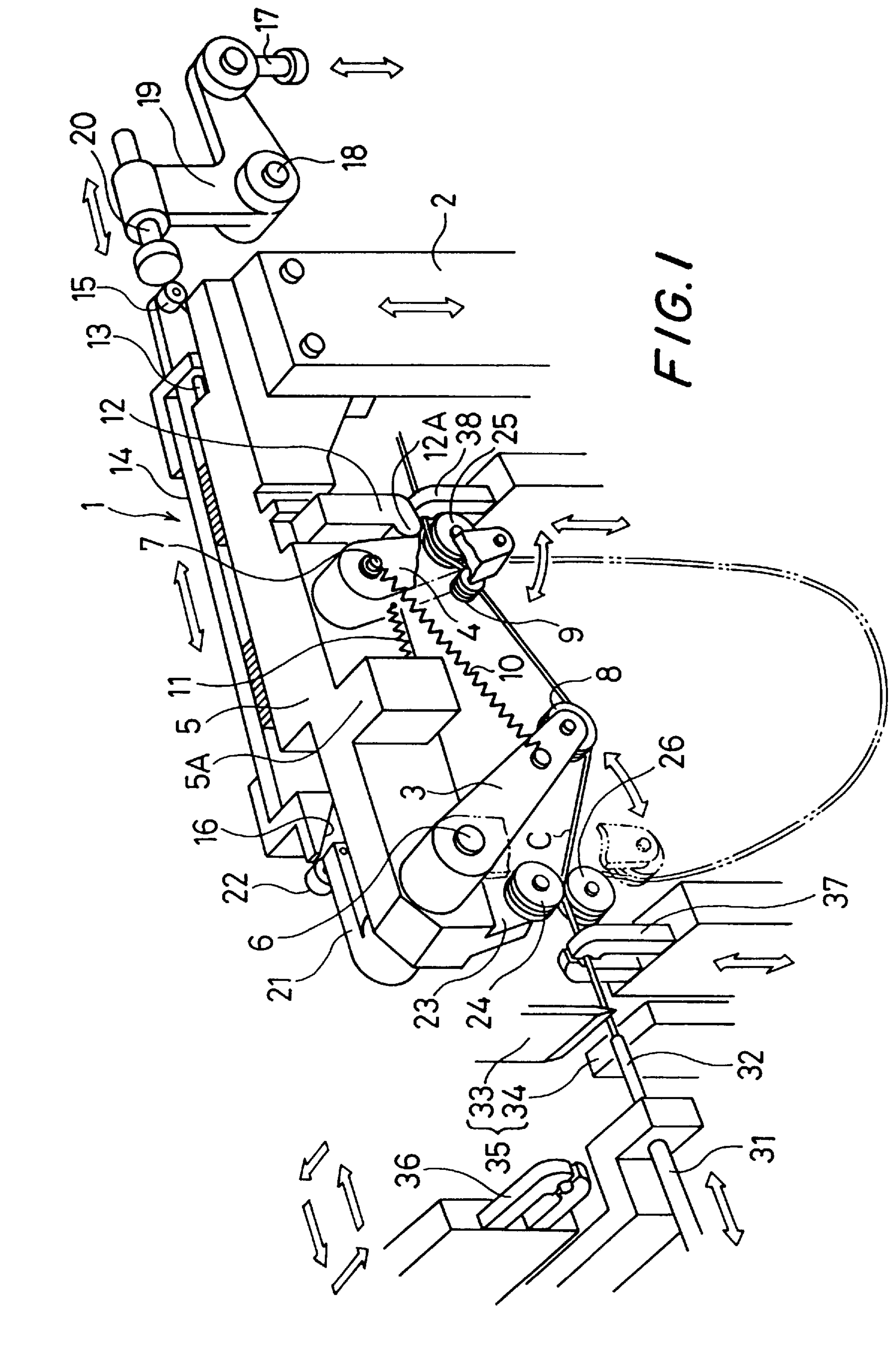
FIG. 1 is a perspective view illustrating an embodiment of the device of the present invention.

In FIG. 1, a bend forming device 1 for forming bends at both end portions of a cable is lowered to the illustrated predetermined position by a lifting arm 2 when bend formation is effected.

A supporting body or support 5 is attached to the lifting arm 2 and extends in a horizontal direction for swingably supporting two arm-like supporting members 3 and 4. The supporting members 3 and 4 at upper ends thereof are respectively attached to rotatable shafts 6 and 7, and are swingable. The supporting members 3 and 4 at lower ends thereof rotatably support forming rollers 8 and 9 having peripheral grooves, respectively. An extension spring 10 is stretched between an intermediate portion of the supporting member 3 and the shaft 7, i.e., a swinging center of the supporting member 4, so as to urge the supporting member 3 counterclockwise up to a predetermined position. Meanwhile, a compression spring 11 is disposed between an intermediate portion of the supporting member 4 and a projecting portion 5A of the supporting body 5, so as to urge the supporting member 4 counterclockwise. A stopper 12 is attached to the supporting body 5 to restrict the counterclockwise urging of the supporting member 4 at a fixed position by means of a rounded projection 12A at a lower end of the stopper 12.

On the back-surface side of the supporting body 5, the bend forming device 1 has a sliding body 14 which is supported by the supporting body 5 through a sliding shaft 13 slidably in the longitudinal direction of the device. The sliding body 14 has an abutment roller 15 at a forward end thereof (the forward or front side is the right-hand side in FIG. 1) and a downwardly-inclined abutment surface 16 at a rear end thereof. Disposed in front of the abutment roller 15 is an L-shaped lever 19 which swings about a shaft 18 located at a predetermined position by means of a rod 17 which is raised or lowered as necessary. A pressing member 20 is attached to an upper portion of the L-shaped lever 19, and when the rod 17 is raised, the pressing member 20 is adapted to press the abutment roller 15 rearwardly. In addition, on the back-surface side of the supporting body 5, a lever 21 is attached to the shaft 6 of the supporting member 3, and an abutment roller 22 is rotatably supported by a forward end of the lever 21. When the sliding body 14 is moved backward, the abutment surface 16 of the sliding body 14 is brought into contact with the abutment roller 22, causing the lever 21 to rotate downward.

Further, a roller 24 having a peripheral groove is rotatably supported by a downwardly-oriented projection 23 at a rear end of the supporting body 5.

Figure 2:
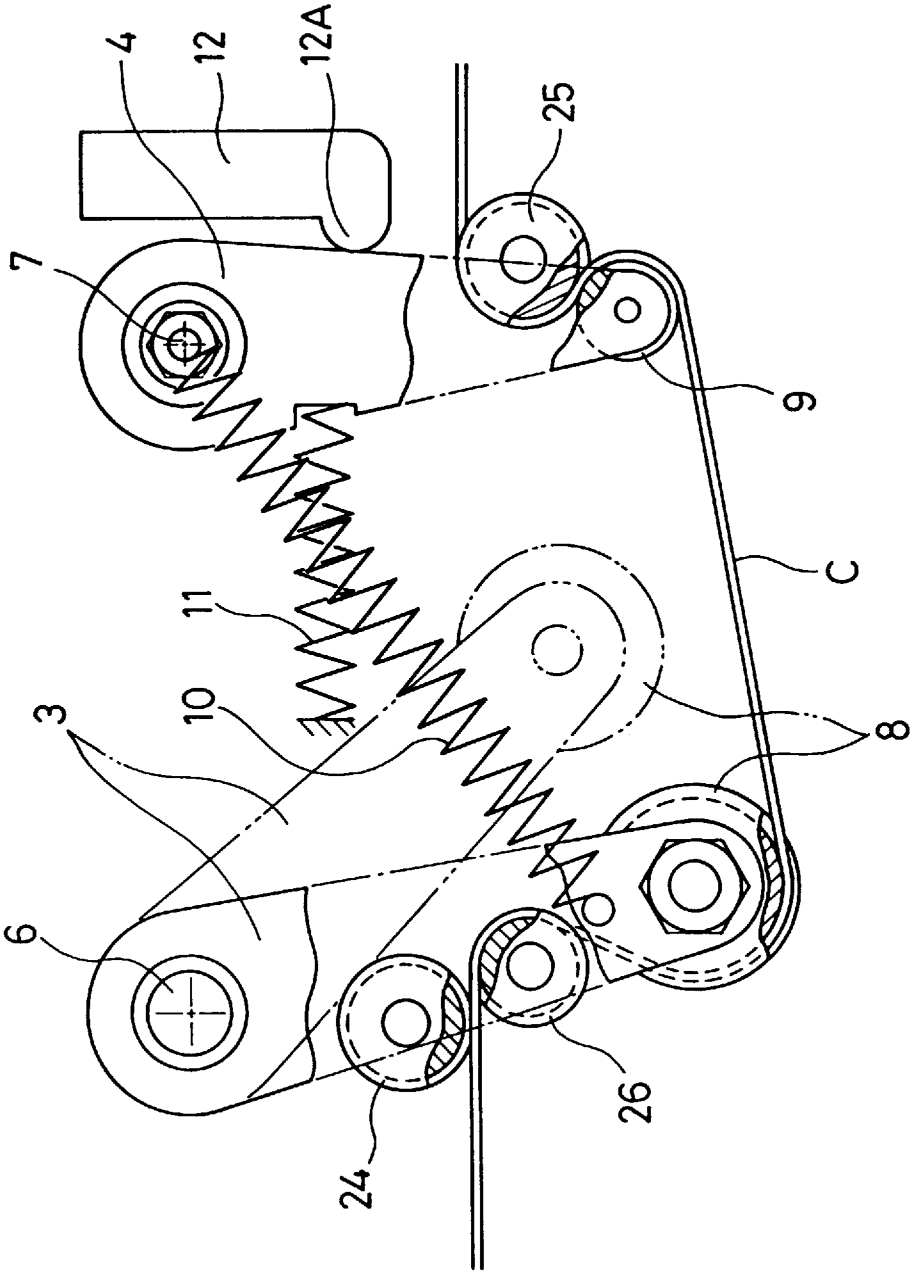
FIG. 2 is a diagram illustrating an arrangement of an essential portion of the device shown in FIG. 1.

A front guide roller 25 having a peripheral groove and a rear guide roller 26 having a peripheral groove are provided at positions below the supporting body 5 so as to forwardly guide a cable C being supplied. The two guide rollers 25 and 26 are adapted to be raised to the positions shown in FIG. 1 from below and lowered from these positions by an unillustrated device. As shown in FIG. 2 illustrating the positional relationships of the respective rollers, when the supporting body 5 is lowered, the rear guide roller 26 at its raised position is in such a position as to allow the roller 24 being lowered to nip the cable from above in association therewith, while the front guide roller 25 at its raised position is in such a position that the front forming roller 9 being lowered rides over the guide roller 25 via the cable and is accommodated on the lower side of the guide roller 25 in a state of nipping the cable in association therewith. The riding of the front forming roller 9 over the front guide roller 25 is possible as the supporting member 4 slightly rotates clockwise against the urging force of the compression spring 11.

As shown in FIG. 1, provided at positions rearwardly of the rear guide roller 26 are a guide pipe 31 capable of advancing and retracting as well as a nozzle 32 supported by the guide pipe 31 in such a manner as to be capable of projecting forwardly, the guide pipe 31 and the nozzle 32 constituting parts of a cable feeding device. A cutter 35 constituted by a blade 33 and a receiving base 34 is disposed in front of the nozzle 32. A gripper 36 is disposed at a lateral position of the nozzle 32 in such a manner as to be capable of moving toward and away from the cable C being guided by the nozzle 32 and of advancing and retracting in the longitudinal direction of the device. Further, liftable grippers 37 and 38 are disposed between the cutter 35 and the rear guide roller 26 and at a position located forwardly of the front guide roller 25, respectively, so as to transport the cable to predetermined connecting positions while gripping both ends of the cut cable C.

Referring also to FIGS. 3A, 3B, 3C, 4A, 4B and 4C, a description will be given of the operation of the above-described device of this embodiment.

Figure 3:
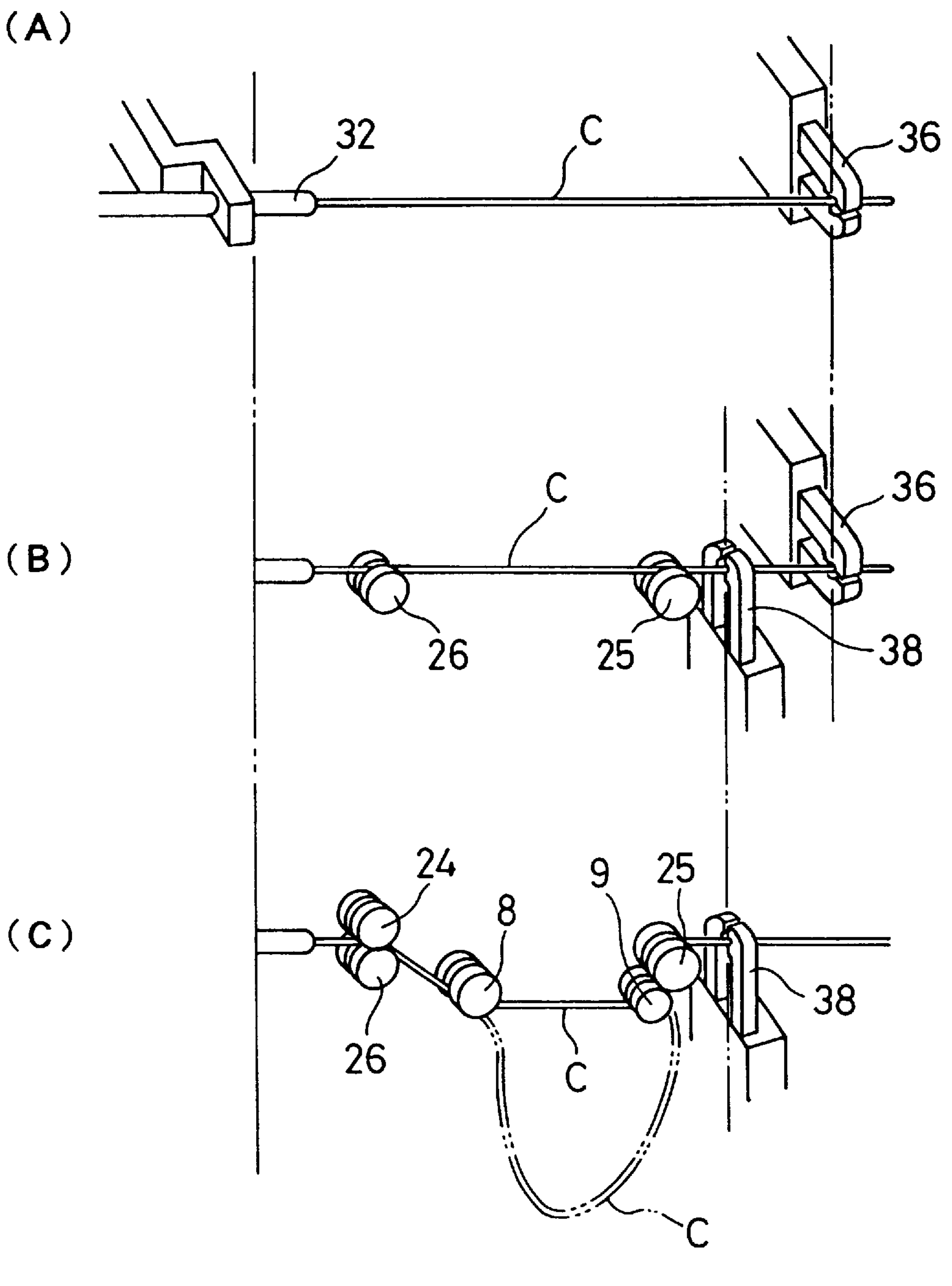
FIGS. 3A, 3B, and 3C are diagrams illustrating a forming process using the device shown in FIG. 1.

(1) First, the cable C is pulled out forwardly from the nozzle 32 of the cable feeding device by the gripper 36 which grips the cable C and moves forwardly (see the state shown in FIG. 3A).

(2) Then, as shown in the state shown in FIG. 3B, the front guide roller 25 and the rear guide roller 26 are raised to positions for guiding the cable C. The front gripper 38 for transport grips the front end of the cable, and the gripper 36 subsequently retracts.

(3) Subsequently, as the lifting arm 2 is operated, the supporting body 5 is lowered (see FIG. 1), and the front forming roller 9 rides over the front guide roller 25 and abuts against the lower side of the front guide roller 25, while the rear forming roller 8 is lowered in a state in which the supporting member 3 is pulled in the forward direction by the extension spring, as in the state shown in FIG. 3C. When the front forming roller 9 rides over the front guide roller 25, the front forming roller 9 bends and forms the cable C along part of the periphery of the front guide roller 25. Meanwhile, the rear forming roller 8 is brought into contact with the cable C at a position located forwardly of the rear guide roller 26, and guides the same. In addition, the roller 24 nips the cable C in association with the rear guide roller 26. The cable C is fed out a predetermined length by the unillustrated feeding device while the cable C is being guided by these rollers.

Figure 4:
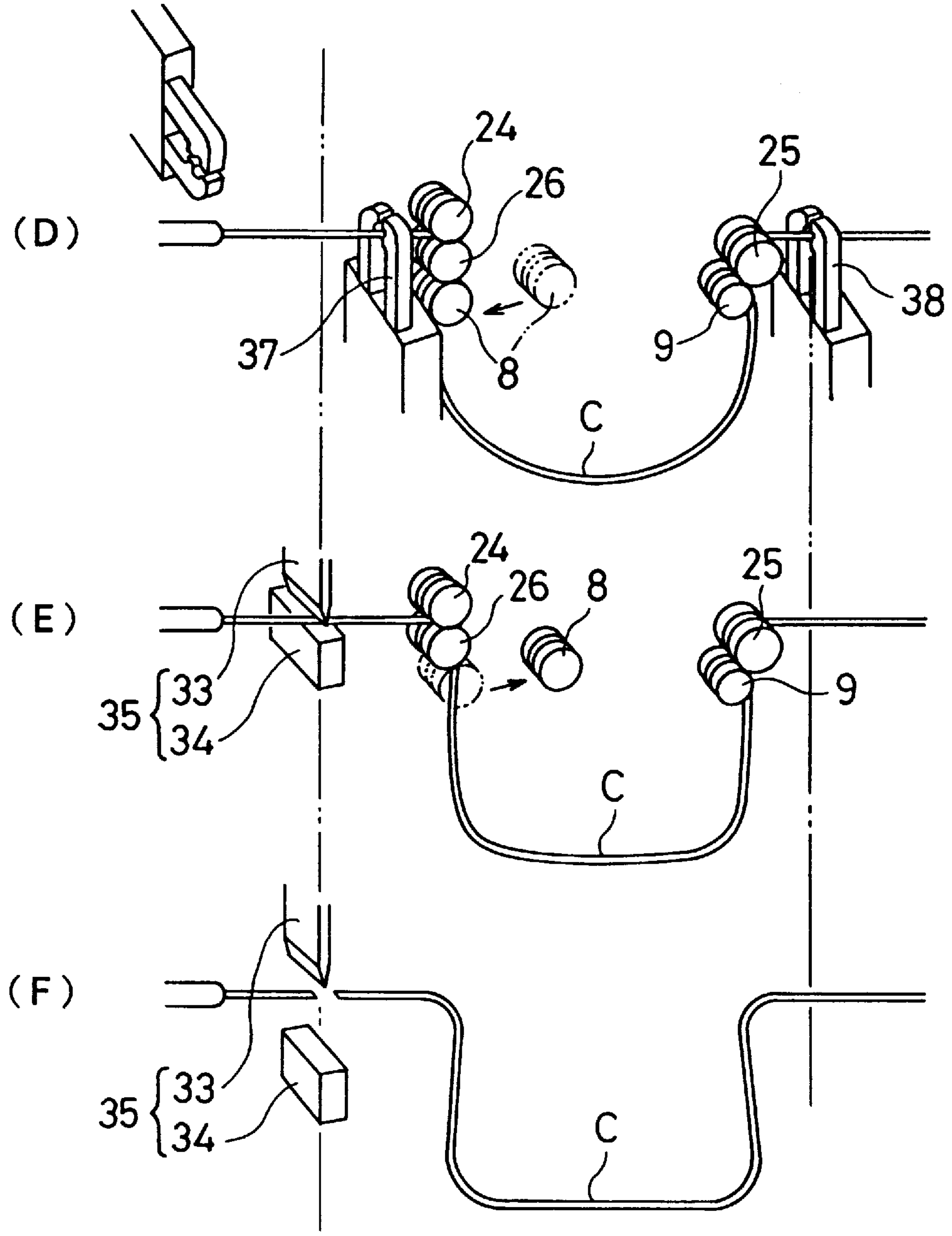
FIGS. 4A, 4B and 4C are diagrams illustrating the forming process using the device shown in FIG. 1.

(4) Next, as the rod 17 shown in FIG. 1 is raised, the sliding body 14 which retracts upon receiving a pressing force from the pressing member 20 presses the abutment roller 22 of the lever 21 downward by means of its inclined abutment surface 16. Consequently, the lever 21 is rotated downwardly, so that the supporting member 3 connected to the lever 21 by means of the shaft 6 is also rotated downwardly (clockwise). Hence, the rear forming roller 8 bends and forms the cable C along part of the periphery of the rear guide roller 26, as shown by the position of the solid line in FIG. 2. Incidentally, when the cable C is thus bent and formed, the rear portion of the cable C is gripped by the rear gripper 37 for transport, as shown in FIG. 4A. In addition, there are cases where it is unnecessary to form a bend in the rear-end portion of the cable C, in which case the rod 17 is not raised, and the lever 21 does not rotate downwardly, so that the rear forming roller 8 remains at a position spaced apart from the rear guide roller 26.

(5) After the bends are formed in its front- and rear-end portions in the aforementioned steps (3) and (4), the cable C is cut off at a portion located rearwardly of the bent portion by the cutter (see the state shown in of FIG. 4B). Incidentally, the rear forming roller 8, after forming the bend, is spaced apart from the rear guide roller 26, as shown by the solid lines in FIG. 4B.

(6) Subsequently, as in the state shown by FIG. 4C, the front forming roller 9, the rear forming roller 8, and the roller 24 are raised, while the front guide roller 25 and the rear guide roller 26 are lowered, so as to be set in a receded state. Then, the grippers 37 and 38 for transport bring the cable C to the connecting apparatus where connection is carried out. Incidentally, in FIGS. 4B, and 4C the grippers 37 and 38 for transport are not illustrated.

The arrangement provided in this embodiment is such that, during the period of the nonoperation, the front guide roller 25 and the rear guide roller 26 are receded downwardly, and the front forming roller 9 and the rear forming roller 8 are receded upwardly, the present invention may not necessarily be arranged as such. Insofar as these members are slightly moved to such an extent that they do not hamper the guiding of the cable, it is possible to sufficiently obtain the advantages of the present invention.

In addition, although, in this embodiment, bends are respectively formed in the front- and rear-end portions of the cable, the present invention is not limited to the same, and it suffices if the rear-end portion is bent only when necessary. For instance, in cases where the connector is connected only to the front end of of the cable, it is possible to cope with the situation by not forming the rear-end end portion and by setting it in a so-called open state.

What is claimed is:

1. A cable-end-portion bend forming device for an automatic cable connecting apparatus, comprising:

a front guide roller and a rear guide roller spaced from said front guide roller for guiding a cable supplied to said device;

a front forming roller and a rear forming roller positioned between said front guide roller and said rear guide roller to engage the cable against said front guide roller and said rear guide roller, respectively; and a supporting member for rotatably supporting said rear forming roller movably mounted to move said rear forming roller between a position in close proximity to said rear guide roller and a position spaced apart therefrom.

2. A cable-end-position bend forming device for an automatic cable connecting apparatus according to claim 1, comprising a drive to selectively move and not move said supporting member and thereby selectively move said rear forming roller between the position in close proximity to said rear guide roller and the position spaced apart therefrom.

3. A cable-end-portion bend forming device for an automatic cable connecting apparatus according to claim 1 or 2, wherein said rear forming roller at the position spaced apart from said rear guide roller is located slightly lower than the height of said rear guide roller.

4. A cable-end-portion bend forming device for an automatic cable connecting apparatus according to claim 1 comprising a support to which said first forming roller is mounted and to which said supporting member is swingably mounted, said support being movable to position said first forming roller and said second forming roller into and out of engagement with the cable.

5. A cable-end-portion bend forming device for an automatic cable connecting apparatus according to claim 4 comprising another supporting member swingably mounted to said support, said second forming roller being rotatably mounted to said other supporting member.

* * * * *